(12) United States Patent
Sato

(10) Patent No.: US 9,699,416 B2
(45) Date of Patent: Jul. 4, 2017

(54) CIGARETTE INSPECTION APPARATUS

(71) Applicant: JAPAN TOBACCO INC., Tokyo (JP)

(72) Inventor: Jun Sato, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 973 days.

(21) Appl. No.: 13/730,438

(22) Filed: Dec. 28, 2012

(65) Prior Publication Data

US 2013/0113917 A1    May 9, 2013

Related U.S. Application Data

(63) Continuation of application No. PCT/JP2010/061016, filed on Jun. 29, 2010.

(51) Int. Cl.
*H04N 9/47* (2006.01)
*H04N 7/18* (2006.01)
*A24C 5/34* (2006.01)
*B65B 19/28* (2006.01)

(52) U.S. Cl.
CPC .............. *H04N 7/18* (2013.01); *A24C 5/3412* (2013.01); *B65B 19/28* (2013.01)

(58) Field of Classification Search
CPC ................... G06T 7/0004; G06T 2207/30108
USPC ..................................... 348/86, 92; 382/141
See application file for complete search history.

(56) References Cited

U.S. PATENT DOCUMENTS

| | | | |
|---|---|---|---|
| 5,588,068 A * | 12/1996 | Longest | A24C 5/3412 348/125 |
| 5,979,140 A | 11/1999 | Focke et al. | |
| 6,511,405 B1 * | 1/2003 | Focke | B65B 53/02 493/129 |
| 2006/0098214 A1 * | 5/2006 | Wilson | A24C 5/3412 356/634 |
| 2006/0180167 A1 | 8/2006 | Spatafora et al. | |

(Continued)

FOREIGN PATENT DOCUMENTS

| | | |
|---|---|---|
| JP | 2003-153679 A | 5/2003 |
| JP | 3437753 B2 | 8/2003 |

(Continued)

*Primary Examiner* — Jamie Atala
*Assistant Examiner* — Masum Billah
(74) *Attorney, Agent, or Firm* — Birch, Stewart, Kolasch & Birch, LLP

(57) ABSTRACT

An image of the filter end faces of a bundle of cigarettes arranged side by side with axes thereof paralleled is acquired as an inspection image, and the diameters of the individual cigarettes of the bundle in the inspection image are obtained and compared with normal diameters associated with the respective cigarettes in the inspection image, to determine axial displacement of cigarettes from the bundle (first determination section). Also, the centers of gravity of the end faces of the individual cigarettes are obtained, and based on the difference between an inter-center-of-gravity distance which is the distance between an outermost cigarette in the bundle and its adjacent cigarette, and an inter-center-of-gravity distance which is the distance between adjacent cigarettes located in the central part of the bundle and belonging to the same tier as the outermost cigarette, axial displacement of the outermost cigarettes is determined (second determination section).

20 Claims, 8 Drawing Sheets

(56) References Cited

U.S. PATENT DOCUMENTS

2007/0101683 A1* 5/2007 Bray et al. .................. 53/444
2013/0002853 A1* 1/2013 Okuyama .................. 348/92

FOREIGN PATENT DOCUMENTS

| JP | 2006-174835 A | | 7/2006 |
|----|---------------|---|--------|
| JP | 2010055100 | * | 3/2010 |

* cited by examiner s>TH1, s>TH2

(L1−L3)>X, (L2−L4)>Y

CIGARETTE INSPECTION APPARATUS

CROSS REFERENCE TO RELATED APPLICATIONS

This application is a Bypass Continuation of PCT International Application No. PCT/JP2010/061016 filed on Jun. 29, 2010, which is hereby expressly incorporated by reference into the present application.

TECHNICAL FIELD

The present invention relates to a cigarette inspection apparatus capable of reliably detecting axial displacement of individual filter-tipped cigarettes in a cigarette bundle obtained by arranging a plurality of filter-tipped cigarettes side by side with their axes paralleled.

BACKGROUND ART

Filter-tipped cigarettes are assembled into bundles each including a predetermined number of (e.g., 20) filter-tipped cigarettes, and the cigarette bundles are packaged by a packaging machine, such as the one disclosed in Patent Document 1, to produce cigarette packs. In the packaging machine disclosed in Patent Document 1, a wrapper is wrapped around a cigarette bundle comprised of multiple tiers of filter-tipped cigarettes arranged side by side with their axes paralleled, and then excess portions of the wrapper at its opposite open ends are folded inward to close the open ends, thereby packaging the cigarette bundle.

PRIOR ART DOCUMENTS

Patent Documents

Patent Document 1: Japanese Patent No. 3437753

SUMMARY OF THE INVENTION

Problems to be Solved by the Invention

If a cigarette bundle supplied to the packaging machine includes an axially displaced cigarette, that is, if a cigarette is protruding from the filter end faces of the other cigarettes, such a cigarette may possibly constitute an obstacle to the packaging by the packaging machine. Specifically, when the excess portions at the opposite open ends of the wrapper wound around the cigarette bundle are folded inward to close the open ends, a cigarette protruding from a normal filter end face may be crushed, or the closed end of the wrapped bundle may be distorted, or even the closing operation itself may be impeded. It is therefore important that a cigarette bundle including an axially displaced cigarette should be excluded (rejected) from targets of packaging, in order to maintain the quality of produced cigarette packs.

To detect an axially displaced cigarette included in a cigarette bundle, more specifically, to detect a cigarette protruding from the normal filter end face, unevenness of the filter end faces of the cigarettes in the bundle may be optically checked from a direction perpendicular to the axial direction of the cigarettes, for example. It is difficult, however, to install an optical device, such as a camera for acquiring an image of the filter end faces of the cigarettes from one side of the cigarette bundle or an optical sensor, in a limited space of the packaging machine. Another problem is that, since the excess portion, or closing end portion, of the wrapper wound around the cigarette bundle projects from the filter end faces of the cigarettes, it is not possible, because of the projecting wrapper, to acquire an image of the filter end faces of the cigarettes from one side of the cigarette bundle.

The present invention was made to eliminate these inconveniences, and an object thereof is to provide a cigarette inspection apparatus capable of reliably detecting an axially displaced cigarette, more particularly, a cigarette axially protruding from a normal filter end face, in a bundle of cigarettes arranged side by side with their axes paralleled, from an axial direction of the cigarettes.

Means for Solving the Problems

The present invention was created taking account of the fact that a packaging machine, for example, the packaging machine mentioned above, has incorporated therein a subminiature camera for acquiring an image of the filter end faces of the cigarettes from an axial direction of the cigarette bundle to detect a stain on the filter end faces of the cigarettes, and the fact that filter diameters in an inspection image acquired by the camera vary basically depending on the distance (imaging distance) between the camera and the filter end face.

The camera incorporated in the packaging machine is extremely compact in size, and an inspection image acquired by this type of camera is generally subject to barrel distortion. Thus, in a marginal region of the inspection image, images of the filter end faces are distorted, possibly interfering with the measurement of filter diameters. According to the present invention, the measures stated below are taken in order that a cigarette protruding from the normal filter end face of the cigarette bundle may be detected with high accuracy without being affected by the distortion of the inspection image.

A cigarette inspection apparatus according to the present invention is used for acquiring, as an inspection image, an image of filter end faces of a bundle of filter-tipped cigarettes arranged side by side with axes thereof paralleled, with use of a camera directed in an axial direction of the cigarettes, and analyzing the inspection image to inspect the cigarettes for axial displacement.

The cigarette inspection apparatus comprises a determination section configured to obtain, in the inspection image, diameters of the individual cigarettes in the bundle and compare the obtained diameters of the cigarettes with normal diameters associated with the respective cigarettes in the inspection image and determined beforehand in accordance with respective locations of the cigarettes in the bundle, to determine whether or not any one of the cigarettes is protruding from the bundle.

The determination section judges, a cigarette to be protruding from the bundle if the diameter of the cigarette in the inspection image is greater than a threshold which is set using, as a reference, the normal diameter associated with the corresponding cigarette in the inspection image.

The cigarette inspection apparatus of the present invention may alternatively comprise a determination section configured to obtain, in the inspection image, centers of gravity of the end faces of the individual cigarettes in the bundle, obtain inter-center-of-gravity distances between adjacent ones of the cigarettes, and check differences between the inter-center-of-gravity distances to determine whether or not any one of the cigarettes is protruding from the bundle.

The determination section judges a cigarette to be protruding from the bundle if the inter-center-of-gravity distance between each of outermost cigarettes in the bundle and a cigarette adjacent to the outermost cigarette and the inter-center-of-gravity distance between adjacent ones of the cigarettes except the outermost cigarettes in the bundle differ from each other by more than a preset threshold.

The bundle of filter-tipped cigarettes includes, for example, multiple tiers of filter-tipped cigarettes arranged side by side with axes thereof paralleled. In this case, the determination section executes a determination process with respect to each of the multiple tiers of filter-tipped cigarettes arranged side by side with the axes thereof paralleled.

The cigarette inspection apparatus of the present invention may comprise: a first determination section configured to obtain, in the inspection image, diameters of the individual cigarettes except outermost cigarettes in the bundle and compare the obtained diameters of the cigarettes with normal diameters associated with the respective cigarettes in the inspection image and determined beforehand in accordance with respective locations of the cigarettes in the bundle, to determine whether or not any one of the cigarettes except the outermost cigarettes is protruding from the bundle; and a second determination section configured to obtain, in the inspection image, centers of gravity of the end faces of the individual cigarettes in the bundle, obtain an inter-center-of-gravity distance between each of the outermost cigarettes in the bundle and a cigarette adjacent to the outermost cigarette and an inter-center-of-gravity distance between adjacent ones of the cigarettes except the outermost cigarettes in the bundle, and check a difference between the inter-center-of-gravity distances to determine whether or not any one of the outermost cigarettes is protruding from the bundle.

Preferably, the first determination section is configured to judge a cigarette to be protruding from the bundle if the diameter of the cigarette in the inspection image is greater than a threshold which is set using, as a reference, the normal diameter associated with the corresponding cigarette in the inspection image.

Also, the second determination section is configured to judge a cigarette to be protruding from the bundle if the inter-center-of-gravity distance between each of the outermost cigarettes in the bundle and a cigarette adjacent to the outermost cigarette and the inter-center-of-gravity distance between adjacent ones of the cigarettes except the outermost cigarettes in the bundle differ from each other by more than a preset threshold.

Where the bundle of filter-tipped cigarettes includes multiple tiers of filter-tipped cigarettes arranged side by side with axes thereof paralleled, the first and second determination sections preferably execute respective determination processes with respect to each of the multiple tiers of filter-tipped cigarettes arranged side by side with the axes thereof paralleled.

Preferably, the first and second determination sections detect positional deviation of the bundle of cigarettes in the inspection image and, after correcting the positional deviation of the end faces of the cigarettes in the inspection image, analyze the end faces of the individual cigarettes to determine whether or not any one of the cigarettes is protruding from the bundle. Also, the inspection image is preferably obtained by acquiring an image of the filter end faces of the bundle of cigarettes before a filter-side end of the bundle of cigarettes is covered with a wrapper in a packaging machine.

The center of gravity of the end face of each of the cigarettes in the bundle may be obtained by subjecting the inspection image to a shrinking process to shrink the image of the end face of the cigarette, comparing the shrunken image of the end face of the cigarette which is set apart from an adjacent cigarette because of the shrinking process, with a preset normal pattern, and obtaining, as the center of gravity of the end face of the cigarette, a position of the normal pattern assumed when the image of the end face of the cigarette is contained in the normal pattern.

Preferably, in this case, the shrinking process for the inspection image is performed with respect to each of search regions which are set so as to correspond to respective tiers of the bundle of cigarettes in the inspection image, for example.

Advantageous Effects of the Invention

In the cigarette inspection apparatus configured as described above, the cigarettes except the outermost ones in the bundle, for example, are checked for their diameter in accordance with the respective locations of the cigarettes in the bundle, and the outermost cigarettes are checked for the inter-center-of-gravity distance between each of the outermost cigarettes and the cigarette adjacent to the outermost cigarette. Accordingly, even in the case where a wide-angle subminiature camera is used to acquire an image of the filter end faces of cigarettes and thus the inspection image obtained for analysis is associated with barrel distortion, for example, protrusion of each of the cigarettes from a reference filter end face of the bundle can be determined with high accuracy.

With respect to the cigarettes except the outermost ones in the bundle in particular, the filter diameters of the cigarettes are absolutely determined in the inspection image by using discrimination thresholds set in accordance with the respective locations of the cigarettes. For the outermost cigarettes in the bundle, the inter-center-of-gravity distance between each of the outermost cigarette and the cigarette adjacent to the outermost cigarette and the inter-center-of-gravity distance between adjacent ones of the cigarettes located in the central part of the bundle are obtained, and protrusion of the outermost cigarette is relatively determined in accordance with a difference between the inter-center-of-gravity distances. It is therefore possible to sufficiently enhance inspection accuracy despite the distortion of the inspection image and to reliably detect protrusion of the individual cigarettes from the reference filter end face.

MODE FOR CARRYING OUT THE INVENTION

A cigarette inspection apparatus according to one embodiment of the present invention will be hereinafter described in detail with reference to the accompanying drawings.

The cigarette inspection apparatus is configured, for example, to acquire, as an inspection image, an image of filter end faces of a predetermined number of filter-tipped cigarettes arranged side by side and supplied to a packaging machine for packaging the cigarettes by using packaging material, before the filter end faces of the cigarettes are covered with the packaging material, and to analyze the acquired inspection image for inspection of quality of the filter end faces. Specifically, the cigarette inspection apparatus inspects a bundle of a plurality of cigarettes arranged side by side with their axes paralleled, for axial displacement of the cigarettes, in other words, protrusion of the cigarettes from a reference filter end face.

The cigarette inspection apparatus explained herein is incorporated in a packaging machine by way of example. Alternatively, the cigarette inspection apparatus may be incorporated in a production line at a location where a bundle of a predetermined number of filter-tipped cigarettes, which are continuously produced by a cigarette manufacturing machine and a filter tip mounter, is sent to a subsequent process.

Figure 1:
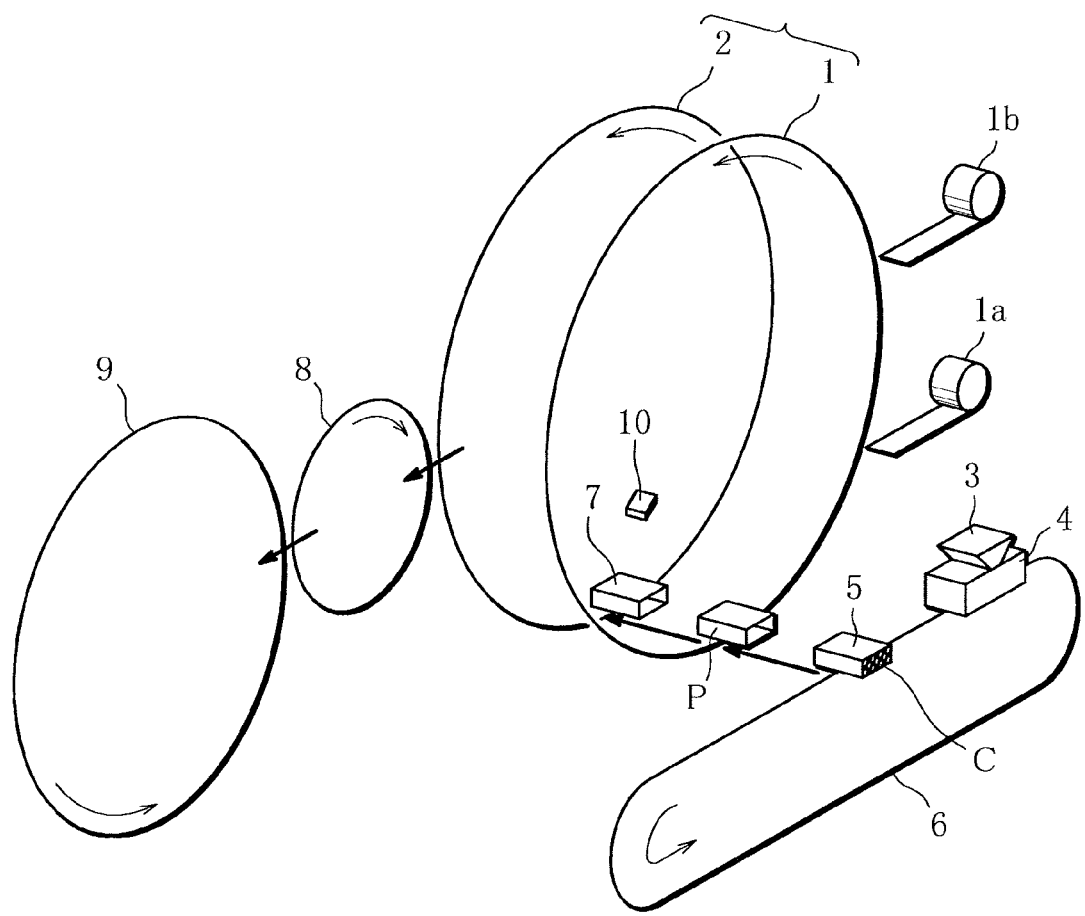
FIG. 1 illustrates a schematic configuration of a cigarette pack packaging machine into which a cigarette inspection apparatus according to the present invention is incorporated.

A cigarette packaging machine into which the cigarette inspection apparatus of the present invention is incorporated is identical, for example, with the one described in detail in the aforementioned Patent Document 1. As schematically illustrated in FIG. 1, the packaging machine is equipped with a forming turret 1 for forming a packaging material into a hollow rectangular parallelepiped with a bottom, and a closing turret 2 arranged coaxially with the forming turret 1. The closing turret 2 is configured to cause a bundle of a plurality of (e.g., 20) cigarettes arranged side by side in advance to enter a hollow rectangular parallelepiped of the packaging material, which is formed by the forming turret 1, and to fold down an open end portion of the packaging material, thereby closing the packaging material.

A bundle of cigarettes is obtained by an arraying device 4, which is supplied with filter-tipped cigarettes having their filters oriented in one direction from a hopper 3, creates three rows of seven, six and seven filter-tipped cigarettes arranged side by side, and stacks up the rows in three tiers. The stack of three tiers of filter-tipped cigarettes is then contained in a carrier pocket 5 and transported to the forming turret 1 by a chain conveyor 6. The bundle C of cigarettes is pushed out of the carrier pocket 5 by a plunger, not shown, into a hollow rectangular parallelepiped of the packaging material P, which is formed by the forming turret 1, and is conveyed, together with the packaging material P, to the inside of a mandrel 7, shown in FIG. 2 by way of example, of the closing turret 2.

The closing turret 2 rotates to cause the mandrel 7 to orbit, and in the process of orbiting, the open end portion of the packaging material P, which is in the form of a hollow rectangular parallelepiped with a bottom and which contains the cigarette bundle. C, is folded inward by the closing turret 2, so that the cigarette bundle C is enclosed and packaged in the packaging material P. The cigarette pack thus obtained by packaging the cigarette bundle C is guided from the closing turret 2 to a drying turret 9 via a transfer turret 8, and after being subjected to a drying process at the drying turret 9, the cigarette pack is output as a product.

In FIG. 1, reference signs 1a and 1b denote wrapper feeding devices arranged along the orbit of the forming turret 1 and configured to feed an inner wrapper Pa, which is an aluminum metallized sheet or the like, and an outer wrapper Pb, which is a sheet of paper or the like, respectively, to a packaging mandrel of the forming turret 1. The inner wrapper Pa and the outer wrapper Pb are superposed one upon the other and wound around the packaging mandrel to form the aforementioned packaging material P in the form of a hollow rectangular parallelepiped with a bottom.

In the cigarette packaging machine configured basically as described above, a camera 10 of the cigarette inspection apparatus according to the present invention is arranged on one side of the orbit of the closing turret 2 to acquire an image of filter end faces of the cigarette bundle C. The camera 10 is a subminiature wide-angle camera and is arranged slightly downstream of a location where the mandrel 7 receives the cigarette bundle C together with the packaging material P, to acquire an image of the filter end faces of the cigarette bundle C before the open end portion of the packaging material P is folded inward, that is, before the filter end faces are covered with the packaging material P.

Figure 2:
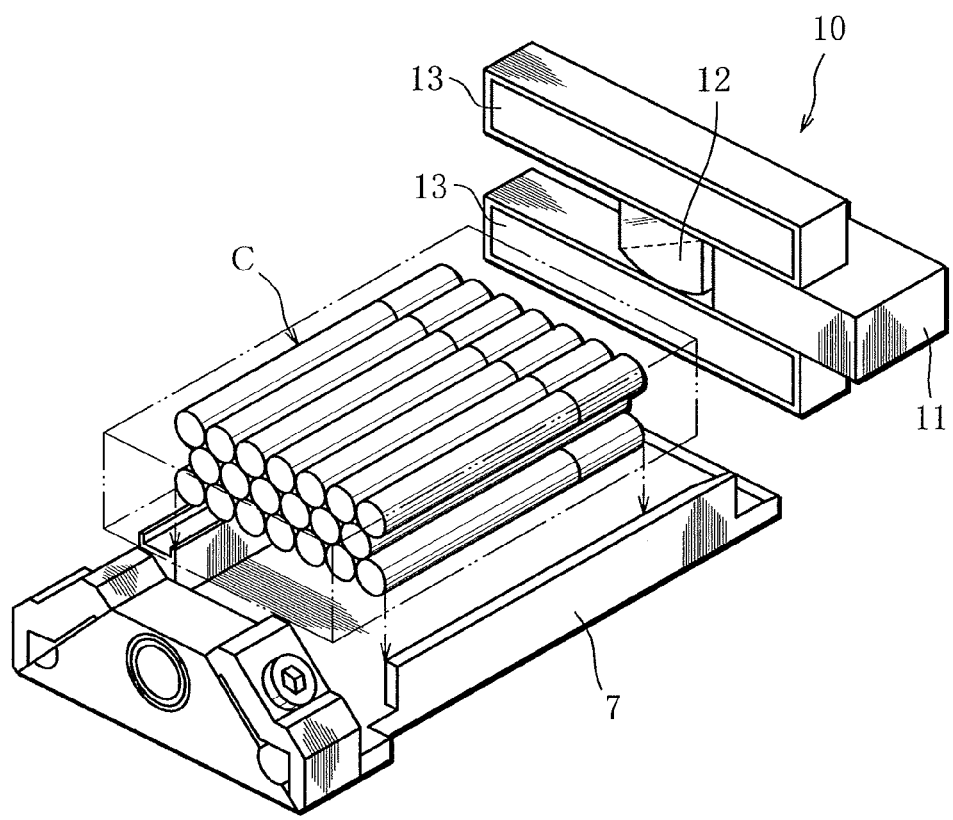
FIG. 2 illustrates the relationship between a bundle of filter-tipped cigarettes supplied to the cigarette pack packaging machine and a camera for acquiring an image of filter end faces of the cigarettes.

Specifically, as shown in FIG. 2 by way of example, the camera 10 is what is called a side-view type with a small depth and acquires an image of objects on one side of a camera body 11 through an optical system 12, such as a prism or the like, attached to the front of the camera body 11. The camera body 11 is provided with a wide-angle lens having a lens diameter of about 12 mm, for example, so as to be able to acquire an image of all filter end faces of the cigarette bundle C collectively at a near distance from the filter end faces.

Strobes 13, 13 are arranged above and below the camera body 11, respectively, to illuminate the direction of imaging. The strobes 13, 13 are each of a small-sized type using LED as a light source, for example. By using the small-sized (subminiature) camera 10, it is possible to install the camera 10 at a near location to the side of the closing turret 2. All filter end faces of the cigarette bundle C supplied to the mandrel 7 of the closing turret 2 can be imaged by the camera 10 before the filter end faces are covered with the packaging material P.

Figure 3:
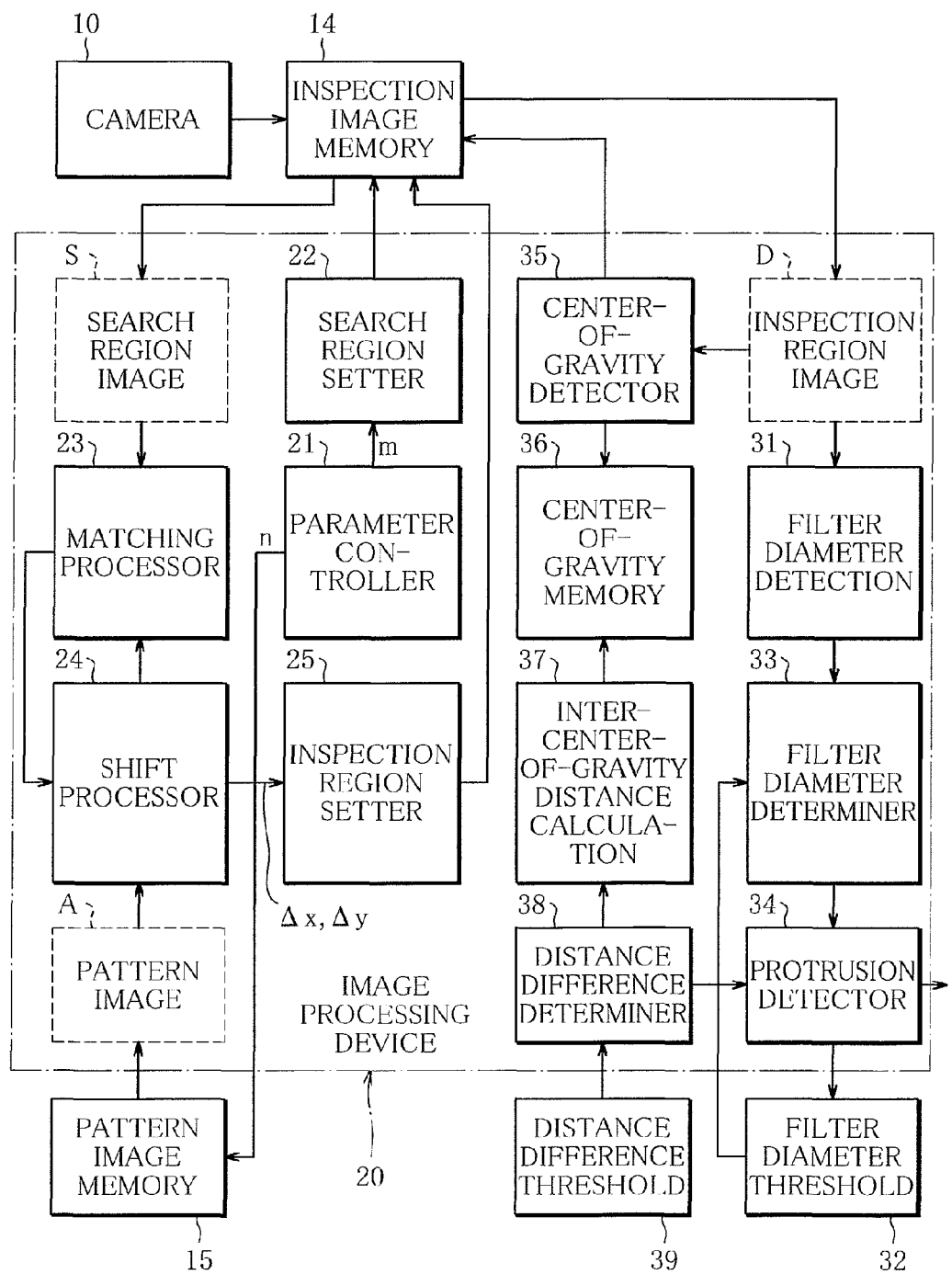
FIG. 3 illustrates a schematic configuration of a cigarette inspection apparatus according to one embodiment of the present invention.

FIG. 3 illustrates a schematic configuration of the cigarette inspection apparatus according to the embodiment of the present invention. The cigarette inspection apparatus includes an inspection image memory 14 for storing an inspection image of the filter end faces of the cigarette bundle C, acquired by the aforementioned camera 10, and an image processing device 20 for analyzing the inspection image (images of the filter end faces of the cigarette bundle C) stored in the inspection image memory 14. The image processing device 20 is a microprocessor that analyzes the inspection image in accordance with a preset program, for example. In the inspection image of the cigarette bundle C acquired by the camera 10, the filter end face of each cigarette forms a bright image region because the filter end face is illuminated by the strobes 13, 13, and the gaps between the cigarettes and the lateral sides of the cigarettes form dark image regions because the illuminating light is not reflected.

The image processing device 20 detects the positions of the individual cigarettes (positions of the filter end faces) in the inspection image by using pattern images set beforehand and registered in a pattern image memory 15, as explained below, for example. Then, with respect to each of the detected positions of the cigarettes, the image processing device 20 selectively clips out an image of a filter end face and inspects the filter end face for its size (filter diameter), position of the center of gravity, and the like.

Figure 4:
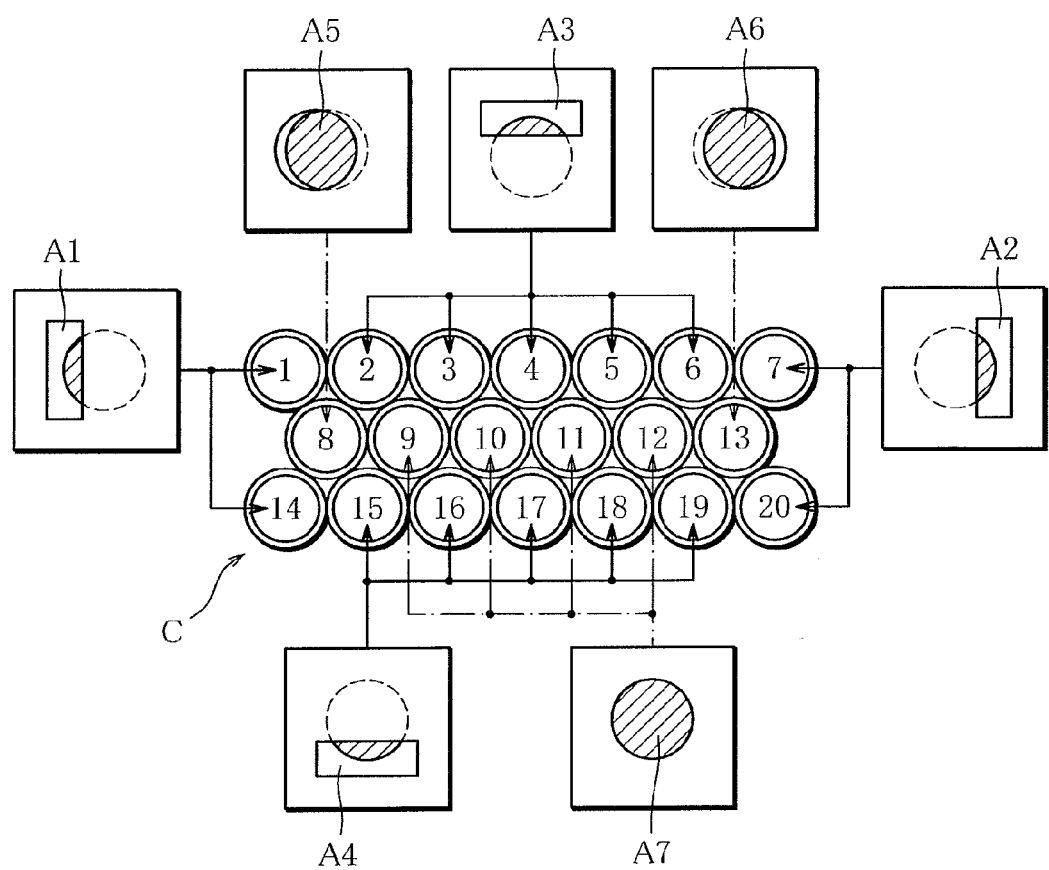
FIG. 4 is a diagram explaining the concept of a cigarette position detection process executed by the cigarette inspection apparatus according to the embodiment of the present invention.

The pattern images are set in accordance with respective locations of a plurality of cigarettes in the bundle C. Where the cigarette bundle C is constituted by 20 cigarettes, the pattern images are set as illustrated in FIG. 4, for example.

Specifically, among the three tiers of seven, six and seven cigarettes in the bundle comprised of a total of 20 cigarettes [1] to [20], the two leftmost cigarettes [1] and [14] have no cigarettes located on their left side. Accordingly, a pattern image A1 is set such that a left-side portion of each cigarette is clipped out in the form of a vertically rectangular strip, to obtain an arcuate image section as a cigarette region (filter region) and the remaining section (left-side portion) as a background (dark portion). Similarly, the two rightmost cigarettes [7] and [20] have no cigarettes located on their right side. Accordingly, a pattern image A2 is set such that a right-side portion of each cigarette is clipped out in the form of a vertically rectangular strip, to obtain an arcuate image section as the cigarette region and the remaining section (right-side portion) as the background (dark portion).

Five cigarettes [2], [3], [4], [5] and [6] of the upper tier have no cigarettes located on their upper side. Thus, with respect to the cigarettes of the upper tier except the leftmost and rightmost cigarettes, a pattern image A3 is set such that an upper portion of each cigarette is clipped out in the form of a horizontally rectangular strip, to obtain an arcuate image section as the cigarette region and the remaining section (upper portion) as the background. Likewise, five cigarettes [14], [15], [16], [17] and [18] of the lower tier have no cigarettes located on their lower side. Thus, with respect to the cigarettes of the lower tier except the leftmost and rightmost cigarettes, a pattern image A4 is set such that a lower portion of each cigarette is clipped out in the form of a horizontally rectangular strip, to obtain an arcuate image section as the cigarette region and the remaining section (lower portion) as the background.

The cigarettes [8] to [13] of the middle tier have cigarettes located on both of their upper and lower sides. With respect to the leftmost cigarette [8], therefore, a pattern image A5 is set such that the cigarette is circularly clipped out with its center shifted to the left, to obtain an elliptic image section as the cigarette region (filter region) and the remaining section (left portion) as the background. Similarly, with respect to the rightmost cigarette [13], a pattern image A6 is set such that the cigarette is circularly clipped out with its center shifted to the right, to obtain an elliptic image section as the cigarette region (filter region) and the remaining section (right portion) as the background.

The central four cigarettes [9], [10], [11] and [12] have cigarettes located on all sides, that is, on their upper, lower, left and right sides. Thus, a pattern image A7 is set such that each cigarette is circularly clipped out without shifting the center, to obtain a circular image as the cigarette region (filter region).

The pattern images for detecting the positions of the individual cigarettes (positions of the filter end faces) in the inspection image are set beforehand as the pattern images A1, A2 to A7 associated with the respective locations of the cigarettes, and registered in the pattern image memory 15.

The image processing device 20 will be now described. The image processing device 20 includes a parameter controller 21. The parameter controller 21 controls a control parameter n to inspect each of a plurality of cigarettes constituting the cigarette bundle C for the size (filter diameter) and center of gravity of each filter end face. The control parameter n specifies the location of each of the cigarettes in the cigarette bundle C, and a maximum value thereof is set to the number N of the cigarettes constituting the cigarette bundle C. Also, the control parameter n is successively updated (incremented) from [n=1] to [n=N] by the parameter controller 21. As a result, the cigarettes at locations successively specified by the control parameter n are inspected one after another.

Specifically, when the control parameter n is specified by the parameter controller 21, a corresponding one A of the pattern images (A1 to A7) set beforehand in association with the respective locations of cigarettes is selectively read out from the pattern image memory 15 in accordance with the control parameter n. A search region setter 22 specifies the location of the cigarette to be detected in accordance with the control parameter n, and sets, as a search region S, part of the inspection image recorded in the inspection image memory 14. Specifically, the search region S for the inspection image is set in advance with respect to each of the locations of the cigarettes, as described later, and in accordance with the control parameter n, the search region S is determined with reference to the inspection image memory 14.

A matching processor 23 is input via a shift processor 24 with the pattern image A which has been selectively read out from the pattern image memory 15 in accordance with the control parameter n. The matching processor 23 cooperates with the shift processor 24 to locate an image section with which the pattern image A coincides, within the search region S of the inspection image specified by the control parameter n.

Specifically, the shift processor 24 moves (shifts) the pattern image A sequentially within the search region S so that the pattern image A can be matched against an image B of the search region S by the matching processor 23. When an image section coinciding with the pattern image A within the image B of the search region S is detected by the matching processor 23, the shift processor 24 obtains amounts Δx, Δy of shift of the pattern image A from a predetermined initial position and identifies, as the position of the cigarette, the position in the search region S indicated by the shift amounts Δx, Δy.

Figure 5:
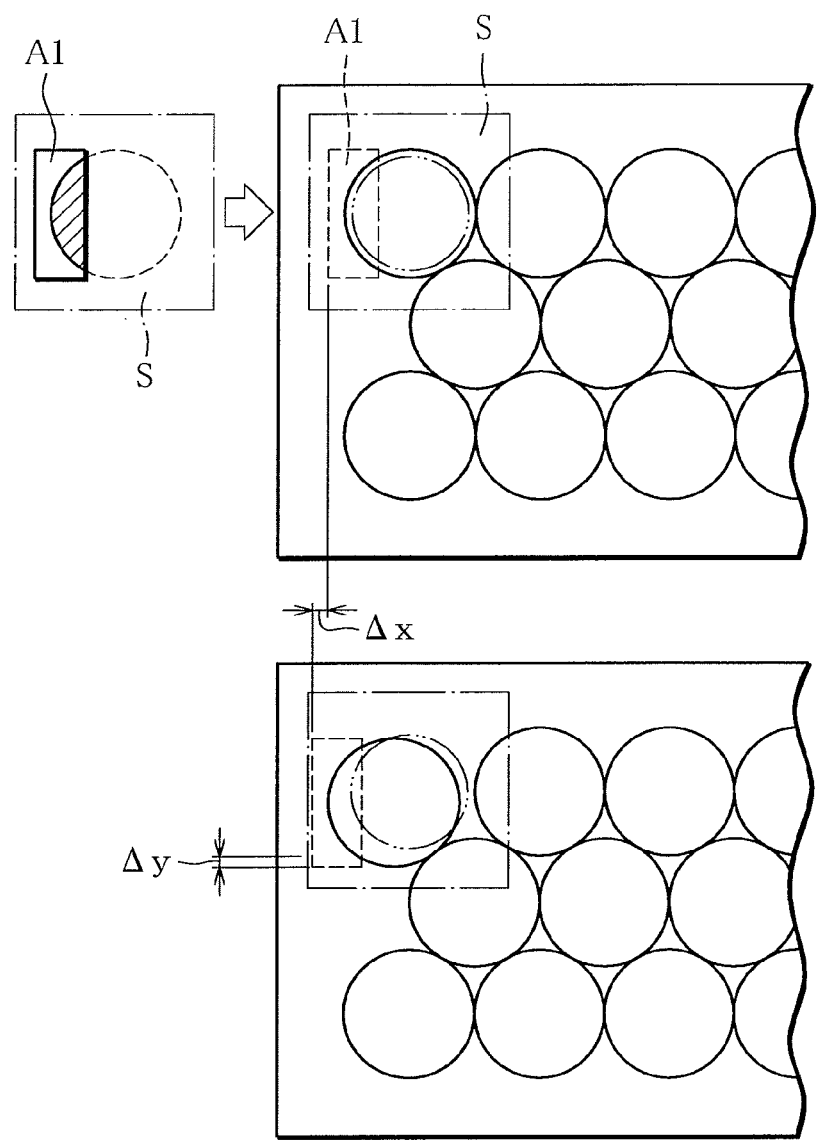
FIG. 5 is a diagram illustrating the relationship between a pattern image shown in FIG. 4 and a search region in an inspection image, and also explaining the concept of cigarette position detection.

For example, where the upper-tier leftmost cigarette [1] of the cigarette bundle C has been specified by the control parameter n, the pattern image A1 obtained by clipping out an image of the left-side arcuate portion of the cigarette, as shown in FIG. 5, is selected and read from the pattern image memory 15. Also, the search region S, for example, a rectangular region, of which the center coincides with a normal location of the upper-tier leftmost cigarette [1] as shown in FIG. 5, is set with respect to the inspection image.

A matching reference position of the pattern image A1 is determined with respect to the search region S such that when the cigarette [1] is present at the predetermined normal location (with no displacement), the pattern image A1 coincides with the inspection image (image of the end face of the upper-tier leftmost cigarette [1]). If the pattern image A1 at the matching reference position fails to coincide with the inspection image, that is, if the pattern image A1 is displaced from the image of the cigarette (filter end face), the pattern image A is shifted (moved) within the search region S. Then, when the pattern image A1 is found to coincide with the inspection image (image of the end face of the cigarette), the amounts of displacement (amounts of shift), Δx, Δy, of the pattern image A1 from the matching reference position are detected as the position of the cigarette [1] in the inspection image.

The cigarette position (Δx, Δy) detected in this manner is provided to an inspection region setter 25. In accordance with the detected cigarette position and the position of the search region S, the inspection region setter 25 selectively clips out, as an inspection region image D, the image of the filter end face of the cigarette [1] whose center is determined by the above positions, from the image stored in the inspection image memory 14. The inspection region image D is used for the detection of the size (filter diameter) of the filter end face as well as for the detection of the center of gravity of the filter end face.

The image (inspection image) of the filter end faces of the cigarette bundle C is acquired by the camera 10 equipped with a wide-angle lens having a lens diameter of about 12 mm as stated above, and wide-angle lenses generally have barrel distortion. Accordingly, the size and shape of a filter end face located in a central region of the inspection image acquired through a central portion of the lens differ from those of a filter end face located in a marginal region of the inspection image acquired through a marginal portion of the lens. Specifically, in the central region of the inspection image, the image is almost free from distortion, but in the marginal region of the inspection image, the image is subject to shape distortion. Images of the outermost cigarettes of the cigarette bundle C in particular are located in the marginal region of the inspection image, and therefore, distortion of the images is noticeable.

Thus, the cigarette inspection apparatus of the present invention is configured to perform inspection taking account of the locations of the individual cigarettes of the cigarette bundle C in the inspection image. Specifically, with respect to the central part of the cigarette bundle C, namely, with respect to the cigarettes except the outermost ones in the cigarette bundle C, axial displacement of the cigarettes, that is, protrusion of the cigarettes from a reference filter end face position, is determined on the basis of the filter diameter in the inspection image (first determination section). With respect to the outermost cigarettes of the cigarette bundle C of which the images are located in the marginal region of the inspection image, axial displacement of the cigarettes, that is, protrusion of the cigarettes from the reference filter end face position, is determined on the basis of the center of gravity of the filter end face (second determination section).

Specifically, the first determination section, which uses the filter diameter for inspection, includes a filter diameter detector 31 and a filter diameter determiner 33, both shown in FIG. 3. The filter diameter determiner 33 compares a filter diameter d detected by the filter diameter detector 31 with a discrimination threshold TH registered beforehand in a threshold memory 32, to determine protrusion of the cigarette from the reference filter end face position.

The filter diameter detector 31 holds a standard filter diameter d, as a reference scale value [s=1.00], which is obtained from the outline (profile) of the filter end face of a cigarette in the inspection region image D acquired beforehand with the filter end face located in the reference position. Also, the filter diameter detector 31 is configured to obtain the diameter d of the filter end face of the cigarette in the inspection region image D, as a normalized scale value s representing a correlation with the reference scale value.

On the other hand, the discrimination threshold TH registered beforehand in the threshold memory 32 is set as follows: If the filter end face of a cigarette is protruding from the reference filter end face position and is nearer to the camera 10, an image of the filter end face of the cigarette acquired by the camera 10 is larger than normal, and the filter diameter d on the inspection region image D is also large. Thus, the discrimination threshold TH is set as a limit value at and below which the protrusion is judged to be permissible. Further, since the extent to which the size of the filter end face of each cigarette is reflected in the image varies depending on the location of the cigarette in the cigarette bundle C under the influence of the aforementioned image distortion, different discrimination thresholds TH are set for different location groups of cigarettes, as exemplified in FIG. 6. Each of the discrimination thresholds TH is also set as a scale value, mentioned above.

Figure 6:
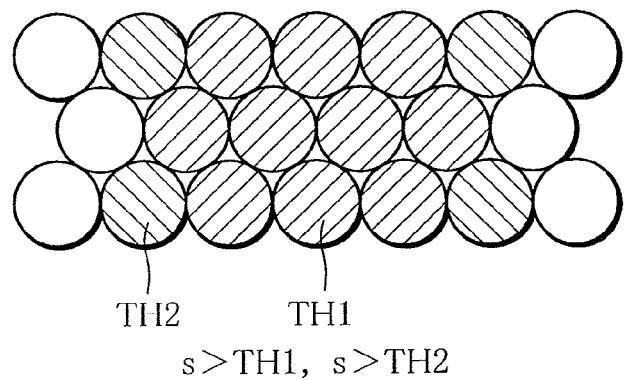
FIG. 6 is a diagram explaining the concept of a process for determining protrusion of cigarettes, executed by a first determination section in the cigarette inspection apparatus according to the embodiment of the present invention.
Figure 7:
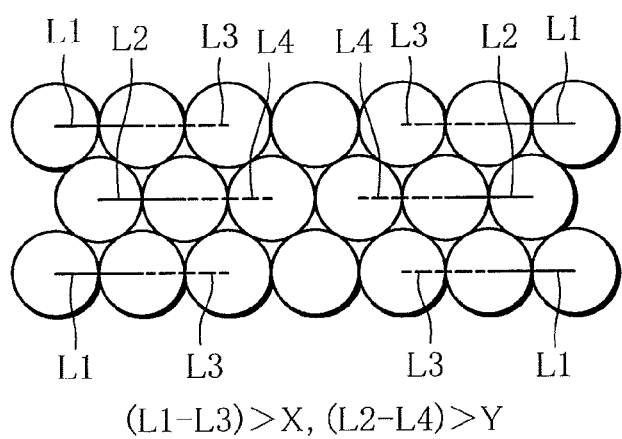
FIG. 7 is a diagram explaining the concept of a process for determining protrusion of cigarettes, executed by a second determination section in the cigarette inspection apparatus according to the embodiment of the present invention.

Specifically, in the cigarette bundle C comprised of three tiers of seven, six and seven cigarettes arranged side by side, a scale value of, for example, [1.055] is set as a threshold TH1 for the ten cigarettes (in FIG. 4, [3], [4] and [5] in the upper tier, [9], [10], [11] and [12] in the middle tier, and [16], [17] and [18] in the lower tier) located in the central part of the cigarette bundle C, as shown in FIG. 6. With respect to the six cigarettes (in FIG. 4, [2] and [6] in the upper tier, [8] and [13] in the middle tier, and [15] and [19] in the lower tier) which adjoin the central part of the cigarette bundle C but are not located in the marginal part (at the extremity) of the cigarette bundle C, a scale value of, for example, [1.035] is set as a threshold TH2 taking account of some image distortion. For the four cigarettes (in FIG. 4, [1] and [7] in the upper tier, and [14] and [20] in the lower tier) which are located in the marginal part (at the extremity) of the cigarette bundle C, no threshold is set because these cigarettes are not subjected to the inspection using the filter diameter.

In the filter diameter determiner 33, the filter diameter d (scale value s) measured in the inspection image with respect to each of the cigarettes located in an intermediate part of the cigarette bundle C is compared with the discrimination threshold TH registered in the threshold memory 32 and corresponding to the location of the cigarette. If the filter diameter d (scale value s) is greater than the discrimination threshold TH, it is judged that the cigarette is protruding from the reference filter end face position. Information (detection information) on the detected cigarette protrusion is provided to a protrusion detector 34, which sends out an eject command so that the cigarette bundle C including the protruding cigarette may be excluded from targets of packaging.

On the other hand, the second determination section, which uses the center of gravity of the filter end face for inspection, includes a center-of-gravity detector 35 shown in FIG. 3, which detects, on the inspection image, the centers of gravity of the filter end faces of the individual cigarettes constituting the cigarette bundle C, and a center-of-gravity memory 36 which temporarily stores data on the centers of gravity detected by the center-of-gravity detector 35, in a manner associated with the respective locations of the cigarettes in the cigarette bundle C. The center of gravity is detected with respect not only to the outermost cigarettes in the cigarette bundle C but also to the cigarettes located in the other part (intermediate part) of the cigarette bundle C.

In the second determination section, when the centers of gravity of the filter end faces of the individual cigarettes constituting the cigarette bundle C are obtained and stored in the center-of-gravity memory 36, for example, an inter-center-of-gravity distance calculator 37 is activated to obtain a distance between the center of gravity of the filter end face of each outermost cigarette in the cigarette bundle C and that of the filter end face of the cigarette adjacent to the outermost cigarette. Further, the inter-center-of-gravity distance calculator 37 calculates a distance between the centers of gravity of the filter end faces of adjacent ones of the cigarettes located in the intermediate part of the cigarette bundle C. More particularly, the inter-center-of-gravity distance calculator 37 calculates the inter-center-of-gravity distance between each outermost cigarette in the cigarette bundle C and its adjacent cigarette which is a second-outermost cigarette in the cigarette bundle C, and the inter-center-of-gravity distance between each second-outermost cigarette in the cigarette bundle C and its adjacent cigarette which is a third-outermost cigarette in the cigarette bundle C. The distances between the centers of gravity of the filter end faces are calculated with respect to each of the three tiers of cigarettes arranged side by side.

Specifically, a distance L1, L2 between the center of gravity of the filter end face of each outermost cigarette in the cigarette bundle C (in FIG. 4, [1] and [7] in the upper tier, [8] and [13] in the middle tier, and [14] and [20] in the lower tier) and that of the filter end face of the cigarette adjacent to the outermost cigarette (in FIG. 4, [2] and [6] in the upper tier, [9] and [12] in the middle tier, and [15] and [19] in the lower tier) is obtained. Also, an inter-center-of-gravity distance L3, L4 between adjacent ones of the cigarettes located in the intermediate part of the cigarette bundle C (in FIG. 4, between [2] and [3] and between [5] and [6] in the upper tier, between [9] and [10] and between [11] and [12] in the middle tier, and between [15] and [16] and between [18] and [19] in the lower tier) is obtained.

After the inter-center-of-gravity distances L1, L2, L3 and L4 between the respective cigarettes are obtained, a distance difference determiner 38 obtains a difference (distance difference: [L1−L3], [L2−L4]) between the inter-center-of-gravity distance L1, L2, which is the distance between each outermost cigarette in the cigarette bundle C and its adjacent cigarette, and the inter-center-of-gravity distance L3, L4, which is the distance between adjacent ones of the cigarettes located in the intermediate part of the cigarette bundle C and belonging to the same tier. The distance difference determiner 38 then compares the distance differences [L1−L3] and [L2−L4] with distance difference thresholds X and Y, respectively, registered beforehand in a threshold memory 39, to determine whether or not any one of the outermost cigarettes in the cigarette bundle C is protruding from the reference filter end face position.

Specifically, if the end faces of the individual cigarettes of the cigarette bundle C are located in the reference position, the inter-center-of-gravity distances L1, L2, L3 and L4 along the tiers of the cigarettes in the inspection image acquired by the camera 10 show fixed scale values dependent on the locations of the respective cigarettes. However, if an outermost cigarette in the cigarette bundle C is protruding from the reference filter end face position, the filter end face of the outermost cigarette is located outside of the original position in the inspection image. Consequently, in this case, the distance between the center of gravity of the outermost cigarette in the cigarette bundle C and the center of gravity of the cigarette adjacent to the outermost cigarette is longer than the original inter-center-of-gravity distance.

Thus, the distance. L1, L2 between the center of gravity of each outermost cigarette in the cigarette bundle C and the center of gravity of the cigarette adjacent to the outermost cigarette may be merely compared with a preset discrimination threshold for simplicity's sake, whereby protrusion of the outermost cigarettes can be easily determined. However, there is no guarantee that the filter end faces of the cigarettes adjacent to the respective outermost cigarettes in the cigarette bundle C are located in the reference filter end face position.

In the cigarette inspection apparatus, therefore, the second determination section makes use of the difference between the inter-center-of-gravity distance L1, L2 of adjacent cigarettes including an outermost cigarette and the inter-center-of-gravity distance L3, L4 of adjacent cigarettes located in the intermediate part of the cigarette bundle C, as stated above. If the distance difference [L1−L3] or [L2−L4] is greater than the predetermined threshold, the corresponding outermost cigarette is judged to be protruding from the reference filter end face position. With regard to the cigarettes located in the intermediate part of the cigarette bundle C, it is only necessary to ascertain by the first determination section that the filter end faces of the cigarettes are located in the reference position, that is, the cigarettes are not protruding from the reference filter end face position.

The discrimination thresholds for the distance differences may be set as follows: Where an outermost cigarette protruding from the reference filter end face position by 5 mm or more is to be detected as abnormal protrusion, for example, the threshold may be set to about [0.50] in terms of scale value for the upper and lower tiers of cigarettes, and be set to about [0.80] in terms of scale value for the middle tier of cigarettes.

With the second determination section configured to determine protrusion of the outermost cigarettes in the cigarette bundle C on the basis of the centers of gravity of the filter end faces of the cigarettes, even if the marginal region of the image acquired by the camera 10 is substantially distorted, axial displacement of the outermost cigarettes, that is, protrusion of the outermost cigarettes from the reference filter end face position, can be accurately determined without being influenced by the distortion. If it is judged by the distance difference determiner 38 that an outermost cigarette is protruding, information on the protrusion is provided to the protrusion detector 34, which then sends out an eject command so that the cigarette bundle C including the protruding cigarette may be excluded from targets of packaging, as in the case where protrusion of a cigarette located in the central part of the cigarette bundle C is detected.

Accordingly, with the cigarette inspection apparatus of the present invention, undesirable protrusion of cigarettes in the cigarette bundle C can be reliably detected by the first and second determination sections, and it is therefore possible to exclude the cigarette bundle C including an axially displaced cigarette without fail before the cigarette bundle C is packaged by the packaging machine. As a result, defective packaging (defective closure) does not occur, making it possible to improve the quality of cigarette packs obtained by packaging cigarette bundles C by the packaging machine. Also, the image processing basically includes the process of calculating the filter diameters on the basis of the profiles of the filter end faces and obtaining the centers of gravity of the filter end faces, and accordingly, execution of the image processing is relatively easy and imposes no great processing load. Thus, it is possible to satisfactorily cope with a situation where the takt time for packaging a cigarette bundle C by the packaging machine is short.

Figure 8A:
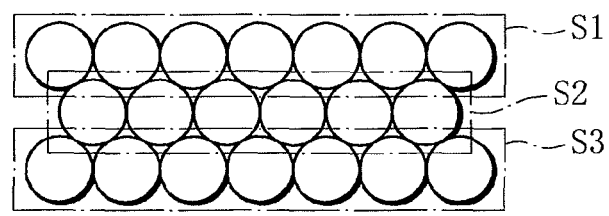
FIG. 8(A) illustrates search regions used in a process for detecting cigarette positions, executed by a cigarette inspection apparatus according to another embodiment of the present invention.

The centers of gravity of the filter end faces of the cigarettes in the cigarette bundle C may alternatively be detected in the manner described below. First, as shown in FIG. 8(A), rectangular search regions S1, S2 and S3 extending along the upper, middle and lower tiers of cigarettes, respectively, are set with respect to the inspection image, and images of the filter end faces are clipped out for the respective search regions S1, S2 and S3. The search regions S1, S2 and S3 are set so that images of the filter end faces of the three tiers of seven, six and seven cigarettes arranged side by side can be collectively clipped out.

Figure 8B:
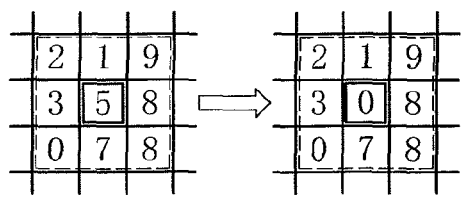
FIG. 8(B) is a diagram explaining how shrinking is performed in the cigarette position detection process executed by the cigarette inspection apparatus according to the other embodiment of the present invention.

Subsequently, the images clipped out according to the respective search regions S1, S2 and S3 are subjected to shrinking, to shrink the images of the filter end faces of the individual cigarettes. The shrinking process is carried out as follows: Each of the search regions S1, S2 and S3 is sequentially searched on a pixel-by-pixel basis, and a pixel at the search position and its surrounding pixels, more specifically, [3×3] pixels as shown in FIG. 8(B), are checked for their pixel values (luminance as an image component). Then, the smallest pixel value (lowest luminance value) among the pixel values of the [3×3] pixels is substituted for the pixel value of the pixel at the search position. It is assumed here that image information indicative of a brighter (whiter) tone has a greater pixel value and that image information indicative of a darker (blacker) tone has a smaller pixel value. In other words, each search region is sequentially searched pixel by pixel, and the pixel value of the focused pixel is replaced by the smallest pixel value among the pixel values of the pixels surrounding the focused pixel, to make the focused pixel blend into the background and thereby shrink the image of the search region.

For example, let us suppose the case where the gradation of the image is represented by 10 levels from the pixel value [9] indicative of white to the pixel value [0] indicative of black, and [3×3] pixels comprised of a focused pixel and its surrounding pixels have values [2, 1, 9, 3, 5, 8, 0, 7, 9] from upper left to lower right, as shown in FIG. 8(B). In this case, the value [5] of the focused pixel is replaced by the minimum value [0] among the pixel values of the surrounding pixels. By successively replacing the values of the focused pixels with the lowest luminance values of the neighboring pixels, high luminance values in the outer portions of the filter end faces in the image are progressively replaced by lower luminance values in the background, so that the image of the search region (images of the filter end faces) is shrunk. Where the value of the focused pixel is replaced by the maximum pixel value of the neighboring pixels, instead of the minimum pixel value, the image of the search region (images of the filter end faces) is expanded.

Figure 8C:
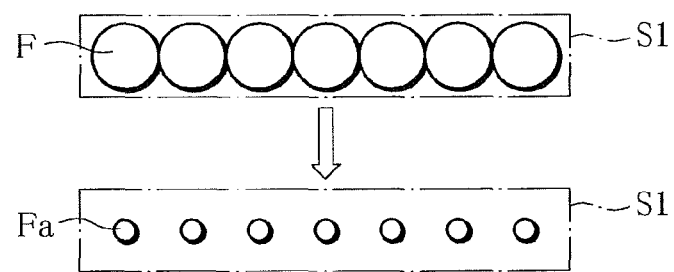
FIG. 8(C) illustrates exemplary images of cigarette end faces on which the shrinking has been performed by the cigarette inspection apparatus according to the other embodiment of the present invention.

The shrinking process is repeatedly executed with respect to each of the search regions S1, S2 and S3 until the images F of the filter end faces in the inspection image are shrunk to a predetermined size. As a result, the images F of the filter end faces in the search regions S1, S2 and S3 are shrunk as shown in FIG. 8(C), and shrunken images (high-luminance regions) Fa of the filter end faces of the neighboring cigarettes are set apart from each other. In this shrinking process, only the outer portions of the filter end faces, which are high in luminance, are lowered in luminance so as to blend into the background, and therefore, the positions (centers of gravity) of the images F representing the respective filter end faces in the search regions S1, S2 and S3 remain unchanged.

Figure 8D:
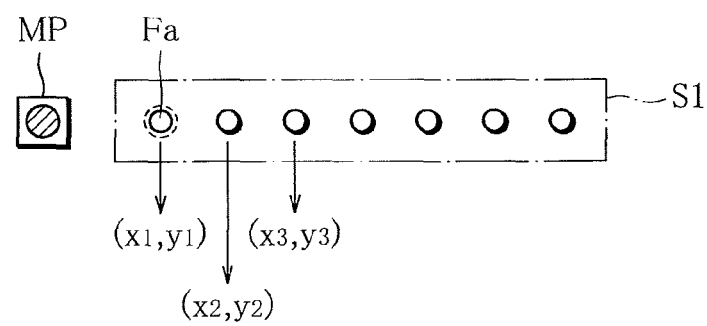
FIG. 8(D) is a diagram explaining the concept of a pattern matching process performed on the shrunken images of cigarette end faces in the cigarette inspection apparatus according to the other embodiment of the present invention.

Subsequently, the shrunken images Fa of the filter end faces in each of the search regions S1, S2 and S3 are subjected to pattern matching using a mask pattern (standard pattern) MP of predetermined size, as shown in FIG. 8(D) by way of example. The mask pattern MP used for the pattern matching is, for example, an image slightly greater in size than the shrunken images Fa of the filter end faces. Each of the search regions S1, S2 and S3 is scanned with the mask pattern MP, and the scanning position of the mask pattern MP assumed when the image Fa of a filter end face is contained in the mask pattern MP is obtained as a position [x, y] of the center of gravity of the image Fa of the filter end face.

Since the images Fa of the filter end faces in the search regions S1, S2 and S3 are obtained from the inspection image acquired by imaging the filter end faces of cigarettes arrayed into a bundle, the positions of the images Fa are nearly fixed. Thus, when the center of gravity, [x, y], of the image Fa of a filter end face detected by the pattern matching is significantly displaced from an original detection position, a judgment may be immediately made that the position of the filter end face is abnormal, that is, the filter end face is significantly displaced (protruding) from the original position.

As for the original detection positions for the images Fa of the filter end faces, a normal image of properly arranged filter end faces may be prepared, as a master image, for each of the search regions S1, S2 and S3, and the locations (position coordinates) of the multiple cigarettes in the master images may be used as the original detection positions. This makes it possible to easily determine displacement of the locations of the individual cigarettes, and eventually the amounts of displacement of the cigarettes from the respective reference positions, with respect to each of the search regions S1, S2 and S3.

After the positions of the images Fa of the filter end faces in the individual search regions S1, S2 and S3 are obtained with no abnormality detected, differences between the centers of gravity of adjacent filter end faces are obtained, and based on the inter-center-of-gravity distances obtained, axial displacement of the filter end faces may be determined in the manner described above. At this time, the centers of gravity of the individual end faces Fa may be compared with the centers of gravity of the properly arranged filter end faces Fa in the normal images prepared as the master images for the respective search regions S1, S2 and S3, and if displacement of the center of gravity of a certain filter end face is outside an allowable range, the position of the filter end face may be judged abnormal. Also, the detected positions of the images Fa of the filter end faces in the individual search regions S1, S2 and S3 may be subjected to deviation correction before being matched against the respective master images.

In this manner, the image of the filter end faces is clipped from the inspection image with respect to each of the search regions S1, S2 and S3, and after the clipped image is subjected to shrinking, the centers of gravity of the individual filter end faces are detected. It is therefore possible to obtain the centers of gravity of the individual filter end faces with the images of the filter end faces set apart from each other. Consequently, compared with the foregoing embodiment, the inspection of filter protrusion can be executed more easily, faster, and with higher accuracy.

The present invention is not limited to the embodiments described above. For example, in the above embodiments, the cigarette bundle C contains 20 cigarettes, but the number of cigarettes constituting the cigarette bundle C is not particularly limited. Specifically, the present invention is equally applicable to a cigarette bundle C containing five or ten cigarettes, for example. Also, various types of cameras may be used as the camera 10. Further, a camera used for acquiring an image of the filter end faces to inspect the filter end faces for stain may of course be used as the camera 10.

In the foregoing embodiments, the cigarette inspection apparatus is incorporated in the packaging machine by way of example, but it may alternatively be installed at an appropriate location of the production line for producing filter-tipped cigarettes, as mentioned above. Also, needless to say, the cigarette inspection apparatus may be so configured as to include either one of the first and second determination sections. Further, after the images of the search regions S1, S2 and S3 are clipped from the inspection image, the shrinking process for the individual search regions S1, S2 and S3 and the process of detecting the centers of gravity of the filter end faces may be executed in a parallel fashion. In this case, the processing time required for the inspection can be significantly shortened. Moreover, the present invention may be modified in various other ways without departing from the scope and spirit of the invention.

EXPLANATION OF REFERENCE SIGNS

- 10: camera
- 13: strobe
- 14: inspection image memory
- 15: pattern image memory
- 20: image processing device
- 31: filter diameter detector
- 32: filter diameter threshold memory
- 33: filter diameter determiner
- 34: protrusion detector
- 35: center-of-gravity detector
- 36: center-of-gravity memory
- 37: inter-center-of-gravity distance calculator
- 38: distance difference determiner
- 39: distance difference threshold memory

The invention claimed is:

1. A cigarette inspection apparatus comprising:
a camera for acquiring, as an inspection image, an image of a filter-side end face of a bundle of filter-tipped cigarettes arranged side by side with axes of the filter-tipped cigarettes within the bundle being parallel relative to each other, said camera being located near a transfer path of the bundle and directed in an axial direction of the bundle of filter-tipped cigarettes arranged side by side,
an analyzer for receiving the inspection image to analyze the cigarettes within the bundle for axial displacement,
a determination section configured to obtain, in the inspection image, diameters of the individual cigarettes arranged side by side within the bundle and compare the obtained diameters of the cigarettes with normal diameters associated with the respective cigarettes in the inspection image to determine whether or not any one of the cigarettes arranged side by side within the bundle is protruding from the filter-side end face of the bundle, the normal diameters being determined beforehand in accordance with respective locations of the cigarettes in the inspection image.

2. The cigarette inspection apparatus according to claim 1, wherein the determination section judges a cigarette to be protruding from the bundle if the diameter of the cigarette in the inspection image is greater than a threshold which is set using, as a reference, the normal diameter associated with the corresponding cigarette in the inspection image.

3. A cigarette inspection apparatus comprising:
a camera for acquiring, as an inspection image, an image of a filter-side end face of a bundle of filter-tipped cigarettes arranged side by side with axes of the filter-tipped cigarettes within the bundle being parallel relative to each other, said camera being located near a transfer path of the bundle and directed in an axial direction of the bundle of filter-tipped cigarettes arranged side by side,
an analyzer for receiving the inspection image to analyze the cigarettes within the bundle for axial displacement,
a determination section configured to obtain, in the inspection image, centers of gravity of filter-side end faces of the individual cigarettes arranged side by side within the bundle, obtain inter-center-of-gravity distances between adjacent ones of the cigarettes, and check differences between the inter-center-of-gravity distances to determine whether or not any one of the cigarettes arranged side by side within the bundle is protruding from the filter-side end face of the bundle.

4. The cigarette inspection apparatus according to claim 3, wherein the determination section judges a cigarette arranged side by side within the bundle to be protruding from the filter-side end face of the bundle if the inter-center-of-gravity distance between each of outermost cigarettes in the bundle and a cigarette adjacent to the outermost cigarette and the inter-center-of-gravity distance between adjacent ones of the cigarettes except the outermost cigarettes in the bundle differ from each other by more than a preset threshold.

5. The cigarette inspection apparatus according to claim 1, wherein:
the bundle of filter-tipped cigarettes includes multiple tiers of filter-tipped cigarettes arranged side by side with axes thereof paralleled, and
the determination section executes a determination process with respect to each of the multiple tiers of filter-tipped cigarettes arranged side by side with the axes thereof paralleled.

6. A cigarette inspection apparatus comprising:
a camera for acquiring, as an inspection image, an image of a filter-side end face of a bundle of filter-tipped cigarettes arranged side by side with axes of the filter-tipped cigarettes within the bundle being parallel relative to each other, said camera being located near a transfer path of the bundle and directed in an axial direction of the bundle of filter-tipped cigarettes arranged side by side,
an analyzer for receiving the inspection image to analyze the cigarettes within the bundle for axial displacement,
a first determination section configured to obtain, in the inspection image, diameters of the individual cigarettes arranged side by side within the bundle except outermost cigarettes in the bundle and compare the obtained diameters of the cigarettes with normal diameters associated with the respective cigarettes in the inspection image to determine whether or not any one of the cigarettes arranged side by side within the bundle except the outermost cigarettes is protruding from the filter-side end face of the bundle, the normal diameters being determined beforehand in accordance with respective locations of the cigarettes in the inspection image; and a second determination section configured to obtain, in the inspection image, centers of gravity of filter-side end faces of the individual cigarettes arranged side by side within the bundle, obtain an inter-center-of-gravity distance between each of the outermost cigarettes in the bundle and a cigarette adjacent to the outermost cigarette and an inter-center-of-gravity distance between adjacent ones of the cigarettes except the outermost cigarettes in the bundle, and check a difference between the inter-center-of-gravity distances to determine whether or not any one of the outermost cigarettes arranged side by side within the bundle is protruding from the filter-side end face of the bundle.

7. The cigarette inspection apparatus according to claim 6, wherein:
the first determination section judges a cigarette arranged side by side within the bundle to be protruding from the filter-side end face of the bundle if the diameter of the cigarette in the inspection image is greater than a threshold which is set using, as a reference, the normal diameter associated with the corresponding cigarette in the inspection image, and
the second determination section judges a cigarette arranged side by side within the bundle to be protruding from the filter-side end face of the bundle if the inter-center-of-gravity distance between each of the outermost cigarettes in the bundle and a cigarette adjacent to the outermost cigarette and the inter-center-of-gravity distance between adjacent ones of the cigarettes except the outermost cigarettes in the bundle differ from each other by more than a preset threshold.

8. The cigarette inspection apparatus according to claim 6, wherein:
the bundle of filter-tipped cigarettes includes multiple tiers of filter-tipped cigarettes arranged side by side with axes thereof paralleled, and
the first and second determination sections execute respective determination processes with respect to each of the multiple tiers of filter-tipped cigarettes arranged side by side with the axes thereof paralleled.

9. The cigarette inspection apparatus according to claim 6, wherein the first and second determination sections detect positional deviation of the bundle of cigarettes in the inspection image, and analyze the end faces of the individual cigarettes obtained by correcting the positional deviation, to determine whether or not any one of the cigarettes arranged side by side within the bundle is protruding from the filter-side end face of the bundle.

10. The cigarette inspection apparatus according to claim 1, wherein the inspection image is obtained by acquiring an image of the filter-side end faces of the bundle of cigarettes before a filter-side end of the bundle of cigarettes is covered with a wrapper in a packaging machine.

11. The cigarette inspection apparatus according to claim 3, wherein the center of gravity of the end face of each of the cigarettes in the bundle is obtained by subjecting the inspection image to a shrinking process to shrink the image of the end face of the cigarette, comparing the shrunken image of the end face of the cigarette which is set apart from an adjacent cigarette because of the shrinking process, with a preset standard pattern, and obtaining, as the center of gravity of the end face of the cigarette, a search position of the normal pattern assumed when the image of the end face of the cigarette is contained in the normal pattern.

12. The cigarette inspection apparatus according to claim 11, wherein the shrinking process for the inspection image is performed with respect to each of search regions which are set so as to correspond to respective tiers of the bundle of cigarettes in the inspection image.

13. The cigarette inspection apparatus according to claim 2, wherein:
the bundle of filter-tipped cigarettes includes multiple tiers of filter-tipped cigarettes arranged side by side with axes thereof paralleled, and
the determination section executes a determination process with respect to each of the multiple tiers of filter-tipped cigarettes arranged side by side with the axes thereof paralleled.

14. The cigarette inspection apparatus according to claim 3, wherein:
the bundle of filter-tipped cigarettes includes multiple tiers of filter-tipped cigarettes arranged side by side with axes thereof paralleled, and
the determination section executes a determination process with respect to each of the multiple tiers of filter-tipped cigarettes arranged side by side with the axes thereof paralleled.

15. The cigarette inspection apparatus according to claim 4, wherein:
the bundle of filter-tipped cigarettes includes multiple tiers of filter-tipped cigarettes arranged side by side with axes thereof paralleled, and
the determination section executes a determination process with respect to each of the multiple tiers of filter-tipped cigarettes arranged side by side with the axes thereof paralleled.

16. The cigarette inspection apparatus according to claim 7, wherein:
the bundle of filter-tipped cigarettes includes multiple tiers of filter-tipped cigarettes arranged side by side with axes thereof paralleled, and
the first and second determination sections execute respective determination processes with respect to each of the multiple tiers of filter-tipped cigarettes arranged side by side with the axes thereof paralleled.

17. The cigarette inspection apparatus according to claim 7, wherein the first and second determination sections detect positional deviation of the bundle of cigarettes in the inspection image, and analyze the end faces of the individual cigarettes obtained by correcting the positional deviation, to determine whether or not any one of the cigarettes arranged side by side within the bundle is protruding from the filter-side end face of the bundle.

18. The cigarette inspection apparatus according to claim 3, wherein the inspection image is obtained by acquiring an image of the filter end faces of the bundle of cigarettes before a filter-side end of the bundle of cigarettes is covered with a wrapper in a packaging machine.

19. The cigarette inspection apparatus according to claim 6, wherein the inspection image is obtained by acquiring an image of the filter end faces of the bundle of cigarettes before a filter-side end of the bundle of cigarettes is covered with a wrapper in a packaging machine.

20. The cigarette inspection apparatus according to claim 6, wherein the center of gravity of the end face of each of the cigarettes in the bundle is obtained by subjecting the inspection image to a shrinking process to shrink the image of the end face of the cigarette, comparing the shrunken image of the end face of the cigarette which is set apart from an adjacent cigarette because of the shrinking process, with a preset standard pattern, and obtaining, as the center of gravity of the end face of the cigarette, a search position of the normal pattern assumed when the image of the end face of the cigarette is contained in the normal pattern.

* * * * *